United States Patent [19]

Weichselbaum

[11] 3,770,477

[45] Nov. 6, 1973

[54] HISTOLOGICAL SLIDE

[75] Inventor: Theodore E. Weichselbaum, Normandy, Mo.

[73] Assignee: Sherwood Medical Industries, Inc., St. Louis, Mo.

[22] Filed: Mar. 16, 1972

[21] Appl. No.: 235,187

[52] U.S. Cl. ............. 117/3, 117/124 B, 117/169 R, 156/57, 161/192, 350/92
[51] Int. Cl. ........................................... G02b 21/34
[58] Field of Search...................... 161/192; 156/57; 117/3, 124 B, 169 R; 424/3; 350/92, 164; 40/152

[56] References Cited
UNITED STATES PATENTS

| 2,207,656 | 7/1940 | Cartwright et al. | 350/164 |
| 2,479,540 | 8/1949 | Osterberg | 117/106 R |
| 3,475,192 | 10/1969 | Langley | 117/124 B |
| 3,536,764 | 1/1951 | Moulton | 117/169 R |
| 2,801,568 | 8/1957 | Dakin | 350/92 |
| 3,498,860 | 3/1970 | Pickett | 156/57 |

Primary Examiner—Charles E. Van Horn
Attorney—Stanley N. Garber et al.

[57] ABSTRACT

A microscope slide to be used for a histological specimen is provided with a transparent metallic fluoride coating, and a biological specimen adhering to the coating. The histological slide is prepared by providing a thin transparent coating of a metallic fluoride on one side of a glass slide, and a biological specimen is applied to the coated side to effect an adhesion between the coating and the specimen.

10 Claims, 3 Drawing Figures

PATENTED NOV 6 1973 3,770,477

HISTOLOGICAL SLIDE

BACKGROUND OF THE INVENTION

This invention relates to microscope slides for use in histological studies and more particularly to an improved histological slide and method of preparing the same.

In general, a histological specimen is prepared from a tissue sample for mounting on a glass slide by any one of several conventional processes. For example, the tissue is embedded in a quantity of paraffin wax and is thereafter sliced into very thin sections, followed by one or more chemical treatments, if necessary, depending on the particular investigation to be conducted.

In the preparation of a histological slide, it is common practice to use as an adhesive solution of egg albumin and glycerin or, in some cases, a solution of a soluable starch in a dilute hydrochloric acid to secure the specimen to the slide. One side of a glass mounting slide is generally coated with one of the above adhesives and the specimen applied to the coated side. Depending upon the particular histological study to be made, the slide is generally subjected to various temperatures, chemicals, and treatments. For example, some treatments are for the purpose of staining the specimen, and some include a general reagent treatment of the specimen preparatory to the microscopic analysis thereof.

There are many disadvantages associated with the use of the above mentioned adhesives. For example, it is generally necessary for skilled technicians to prepare these microscope slides just in advance of use and to allow the adhesive to dry, a time consuming and relatively expensive process. Also, certain treatments, especially those involving relatively severe histochemical steps such as those generally found to cause frequent separation between the specimen and slide, cannot be satisfactorily used on slides having albumin or starch type adhesives since these adhesives are often affected to such a degree that there is a tendency for the specimen to loosen or fall of the glass base. Additionally, when an adhesive containing egg albumin is used, a "dirty" background, i.e., a deposit of unwanted residues, is sometimes obtained, and such an adhesive is subject to bacteriological attack. Also, when a starch containing adhesive is used, the staining procedure is limited because certain stains react with the starch. Thus, in general, past histological slides not only required considerable time and expense to prepare but the type and number of treatments to which they could be subjected were often limited.

SUMMARY OF THE INVENTION

It is therefore an object of the present invention to provide an improved histological slide wherein the above mentioned disadvantages are substantially obviated.

Another object is to provide an improved histological slide which can be precoated with an adhesive substantially in advance of its use or which can be stored substantially indefinitely for subsequent use.

Another object is to provide an improved method of preparing a histological slide that avoids the need for application of the adhesive at the time of use.

Another object of the present invention is to provide an optically transparent histological slide wherein the specimen tenaciously adheres to the mounting member even if the slide is subjected to severe histochemical sequences.

Still another object is to provide a histological slide and method for preparing the same wherein the adhesive used is not subject to bacteriological attack, is highly transparent to visible light, and has a markedly lower surface reflectivity than uncoated or albumin or starch solution coated slides.

Yet another object is to provide a method for preparing a histological slide which utilizes a microscope slide having a substantially uniform, permanent and dry adhesive coating thereon and which is optically transparent.

In accordance with one form of the present invention, a histological slide is provided which includes a base slide member with a transparent coating of a metallic fluoride disposed on one side thereof for receiving a specimen. In accordance with another aspect of the invention a histological slide is prepared by forming a coating of a metallic fluoride on one side of a base member, and applying a biological specimen to the coated side to effect an adherence of the specimen to the base member.

These and other objects and advantages of the present invention will become apparent from the following detailed description and accompanying drawings.

DESCRIPTION OF THE PREFERRED EMBODIMENT

Figure 2:
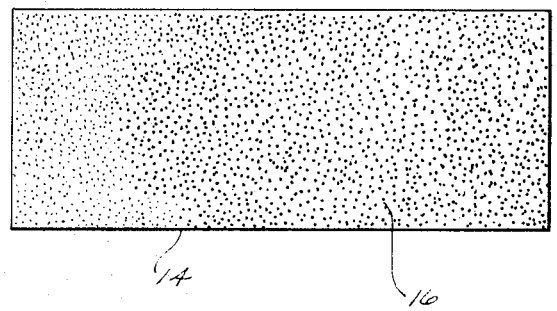
FIG. 2 is a plan view of the base member of FIG. 1.
Figure 3:
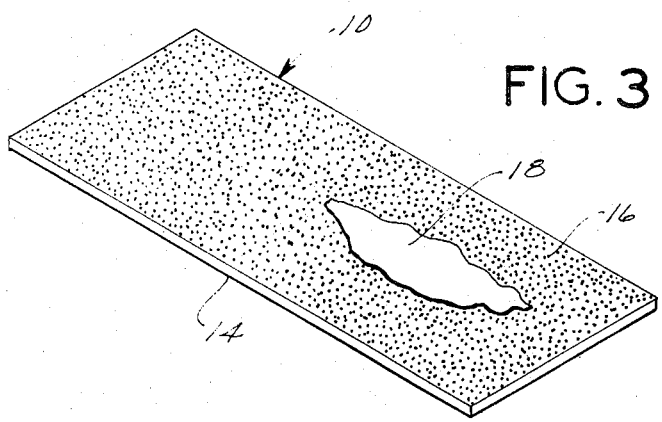
FIG. 3 is a perspective view of the base member with a specimen adhesively connected thereto.
Figure 1:
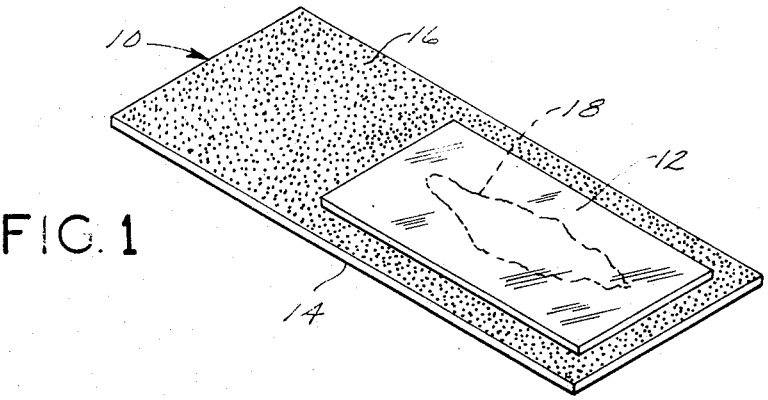
FIG. 1 is a perspective view of a histological slide embodying the present invention.

Referring now to the drawings, there is shown in FIG. 1 a histological slide 10 with a coverslip or cover slide 12, which may be a transparent glass member. Referring also to FIGS. 2 and 3, the histological slide 10 includes a mounting member or base slide 14, such as a transparent glass microscope slide, provided with a transparent film or coating 16 of a metallic fluoride preferably magnesium fluoride ($MgF_2$) and a biological specimen or body tissue 18 for histological examination.

The histological slide 10 can be prepared by applying a transparent film 16 of magnesium fluoride to slide 14, for example, by the well known or conventional vapor deposition process. In such case, film 16 is deposited by evaporating magnesium fluoride onto one side of the glass slide 14 in a vacuum. The deposited transparent film may be of various thicknesses. Successful results have been obtained with magnesium fluoride films having thicknesses of about ⅛, ¼, ½ and 1 wave length of visible light, however, the film preferably being less than ½ wave length. While the adhesive characteristics of coatings of these thicknesses is substantially constant, the optical transparency begins to diminish slightly above about ½ wave length.

The magnesium fluoride film 16 is a dry, hard coating which strongly adheres to the glass surface of the slide 14. Thus, the coated slide as illustrated in FIG. 2 can be conveniently packaged and stored for an indefinite period of time, and is ready for immediate use with a specimen, resulting in considerable savings in laboratory time and expense.

When the biological or pathological tissue specimen 18 is applied to the coated side, the magnesium fluoride coating 16 reacts with the specimen to effect a bond therebetween so that the specimen tenaciously adheres to the base slide 14. For example, the tissue section may be removed from a holding tank, such as a water flotation tank, and positioned on the coated base slide, and then dried. The histological slide as shown in FIG. 3, can be subjected to various well known histological treatments or processes preparatory to microscopic analysis without the danger of the specimen becoming loose or falling off the base slide 14.

In actual tests, a number of histological slides made in accordance with the invention with biological tissue sections adhesively bonded by different thicknesses of magnesium fluoride coatings were subjected, in sequence, to the following treatments:
a. Methylation overnight
b. KOH for 30 minutes
c. wash for 10 minutes
d. $NaBH_4$ (no oxidation) for 1½ hours
e. wash for 15 minutes
f. KOH for 1 hour
g. wash for 10 minutes
$HIO_4$ for 10 minutes
i. wash for 10 minutes
j. water for about 1 hour
k. Schiff for 30 minutes
l. sulfite rinses
m. wash for 10 minutes
n. Dehydrated The complete tissue sections remained on the slides after being subjected to the above severe treatments without any sign of loosening.

Histological slides made in accordance with the present invention were also tested by staining with various dyes without the magnesium fluoride coating holding the dyes. These staining procedures included subjecting the histological slides to carbol-fuchsin, a powerful staining medium, for 48 hours at 60°, without the coating absorbing the dye.

After the histological slide 10 with specimen 18 adhered thereto, as shown in FIG. 3, is subjected to the desired histological treatments, such as staining etc., the cover slide 12 may be applied over the specimen as shown in FIG. 1. Any mountant suitable for the desired application may be used between the cover slide and specimen to adhesively secure the cover slide thereto preparatory to microscopic analysis. Various well known mountants, such as glycerin jelly, Canada Balsam, or UNIMOUNT mountant, a mountant manufactured and sold by the present assignee and described in U.S. Pat. No. 3,467,617, or the like may be used as desired.

It is believed that the excellent adhesiveness of the biological specimen to the magnesium fluoride slide of the present invention is due to the calcium in the tissue combining with the fluoride to produce an insoluble calcium fluoride. While the preferred metallic fluoride is magnesium fluoride, other metallic fluorides, such as strontium fluoride and lithium fluoride, may prove suitable under certain conditions of use.

It should be understood that, although this invention has been described with reference to the illustrated embodiment, modifications thereto may be made without departing from the true spirit and scope of the invention as set forth in the appended claims.

What is claimed is:

1. A histological slide comprising a mounting member, a transparent metallic fluoride coating on said member, and a biological specimen in contact with said coating, said coating adhesively securing said specimen to said member.

2. The histological slide according to claim 1 wherein said mounting member is a transparent microscope glass plate.

3. The histological slide according to claim 2 wherein said metallic fluoride is magnesium fluoride.

4. The histological slide according to claim 3 wherein said layer is a dry deposited coating having a thickness less than one wave length of visible light.

5. The histological slide according to claim 3 further including a transparent cover plate overlying the specimen.

6. A method of preparing a histological slide comprising the steps of forming a transparent coating of a metallic fluoride on one side of a transparent mounting member, and mounting a biological tissue specimen in direct contact with the coating.

7. The method according to claim 1 wherein said coating is magnesium fluoride.

8. The method according to claim 1 wherein saimember is a transparent glass microscope slide, and said coating is magnesium fluoride having a thickness less than one wave length of visible light.

9. The method according to claim 1 further including the step of positioning a transparent cover plate over the specimen in adhesive contact therewith.

10. The method according to claim 1 wherein said member forming step comprises evaporating the metallic fluoride onto said side of the mounting member by vapor deposition.

* * * * *